S. B. MYERS & J. FREUND.
METHOD OF MANUFACTURING REINFORCED TILES.
APPLICATION FILED DEC. 5, 1910.
1,063,579.
Patented June 3, 1913.
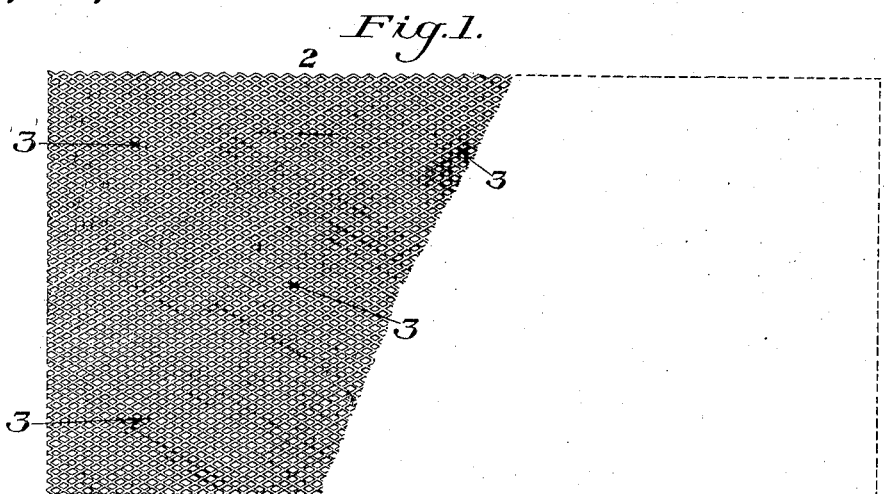
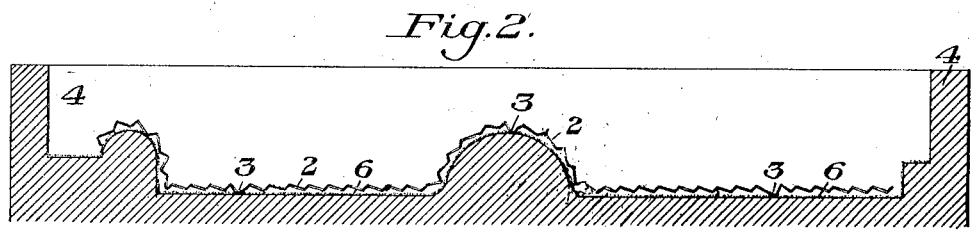
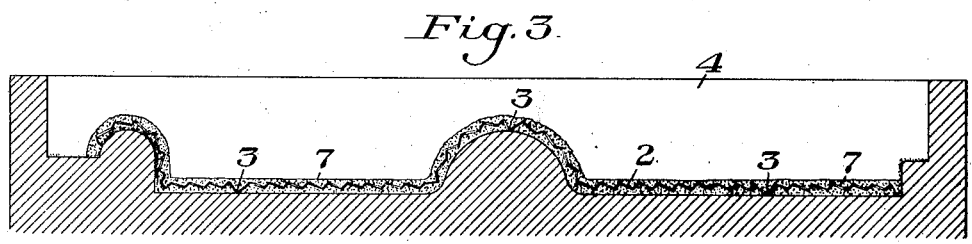
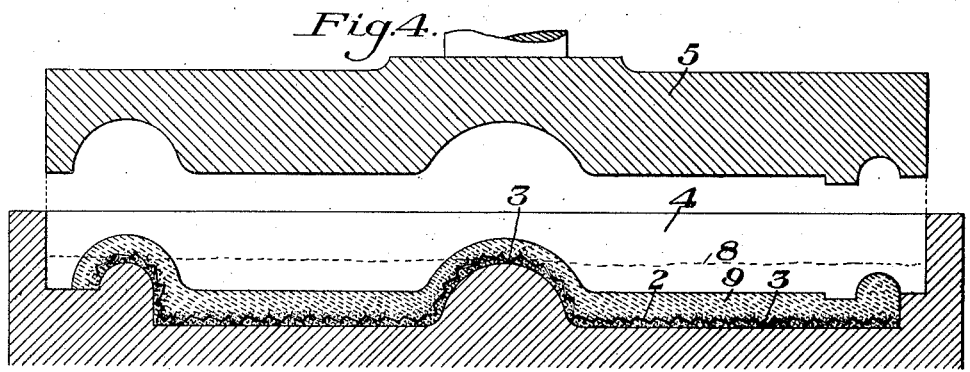

UNITED STATES PATENT OFFICE.

SOLOMON B. MYERS, OF PLAINFIELD, NEW JERSEY, AND JOSEPH FREUND, OF ST. LOUIS, MISSOURI, ASSIGNORS TO AMERICAN CEMENT TILE MANUFACTURING COMPANY, OF WAMPUM, PENNSYLVANIA, A CORPORATION OF PENNSYLVANIA.

METHOD OF MANUFACTURING REINFORCED TILES.

1,063,579.　　　　　　Specification of Letters Patent.　　Patented June 3, 1913.

Application filed December 5, 1910. Serial No. 595,748.

*To all whom it may concern:*

Be it known that we, SOLOMON B. MYERS, a resident of Plainfield, Union county, State of New Jersey, and JOSEPH FREUND, a resident of St. Louis, State of Missouri, have invented a certain new and useful Improvement in Methods of Manufacturing Reinforced Tiles, of which the following is a full, clear, and exact description, reference being had to the accompanying drawings, forming part of this specification, in which—

Figure 1 is a plan view of a portion of a sheet of reinforce adapted to be used for the manufacture of tiles by our improved method; Fig. 2 is a transverse sectional view through a mold illustrating the first step of our improved method; and Figs. 3 and 4 are similar views illustrating further steps thereof.

Our invention relates to the manufacture of reinforced roofing tile from cement or concrete. Heretofore, in tiles of this character, the reinforce was frequently exposed to view on the surface of the tile, due to the reinforce being too close to the surface. The exposed portion would readily corrode and break, leaving the tile weakened at this portion.

The object of our invention is to produce a tile in which the reinforce is properly embedded in the tile and at the proper distance from the faces thereof throughout the entire tile, and in which the body thereof on each side of the reinforce is tied together through the openings in the reinforce.

The precise nature of our invention will be best understood by reference to the accompanying drawings, which will now be described, it being premised, however, that changes may be made without departing from the invention as defined in the appended claims.

Referring to the accompanying drawings, the numeral 2 designates a sheet of reinforce of any desired character. 3 are downwardly extending projections which may be stuck up in the sheet itself, as shown in the drawings, or may be connected thereto in any desired manner.

4 is a box mold having forming surfaces for forming the bottom and edges of the tile, and 5 is a presser plate for forming the top surface thereof.

The mold is first dusted with dry cement, or any dry powdered material from which the tile is formed, as indicated at 6 in Fig. 2, to prevent the tile from sticking thereto. The reinforce 2 is then placed in the mold, the projections 3 thereof resting on the bottom of the mold, so that the body of the reinforce is held slightly above the bottom of the mold. It will also readily be understood that we might support the reinforce by means of a plurality of properly spaced slugs or pellets, or by projections extending upwardly from the face of the mold. We then place a batch of mud on the reinforce and work it through the openings thereof to fill all the openings and the space between the reinforce and the bottom of the mold. At this point we might state that we use the term " mud " in its broad sense, as referring to a plastic material from which tiles might be formed. After this batch of mud has been thoroughly worked through the reinforce we scrape off the surplus material as approximately shown in Fig. 3, in which the numeral 7 designates the first batch. The upper surface of the partially formed tile is thoroughly moistened and a second batch of mud is spread over the surface, as indicated by the dotted line 8. The top of this batch is formed by means of the presser plate 5, or by any other suitable means. In Fig. 4, the second batch, which has been formed over the first batch, is designated by the numeral 9.

We prefer to make the first batch of mud somewhat thinner than the second batch, so that it can readily be worked through the openings in the reinforce to completely fill all the space between the reinforce and the mold and also completely fill all of the openings in the reinforce, so that the reinforce is perfectly embedded in the body of the tile, and also to tie the portion of the tile below the reinforce to the portion above it, through all of the openings in said reinforce. The upper surface of the first batch is then moistened, so that the two batches will flow into each other and be thoroughly knit together. It will readily be understood that a perfectly formed tile can be made by applying all of the mud for forming the tile in one batch, although we prefer the method above described.

The first batch of mud which is worked through the reinforce, will moisten the powdered material which was first dusted into the mold, so that this dust will be removed with the tile and will form a sharp, clear-cut surface on the face of the tile.

The advantages of our invention result from the described method whereby we produce a tile having a reinforce embedded in the body thereof, and which is properly spaced from its surfaces. We are also enabled to produce a tile in which the portions of the tile on opposite sides of the reinforce are tied to each other through the openings in said reinforce, thereby producing a solid reinforced tile without flaws or holes.

We claim:

1. The method of manufacturing reinforced tiles, which consists in first covering the bottom of the mold with a mixture of dry cement and sand, then placing a reinforce in the mold and supporting it above the bottom thereof, then placing a batch of mud on the reinforce, then working the mud through the reinforce to moisten the dry sand and cement in the bottom of the mold, then moistening the upper surface of the first batch of mud to replace the water absorbed by the dry material and also to moisten the top of the first batch so that the second batch will properly intermingle therewith, then placing a second batch of mud on the first batch, and then forming the tile; substantially as described.

2. The method of manufacturing reinforced tiles, which consists in placing a reinforce in a forming mold so that it is spaced from the bottom of the mold by the projections, then placing a batch of mud on the reinforce, then working the mud through the reinforce, then moistening the upper surface of the first batch, then placing a second batch of mud of greater consistency on the first batch, and then forming the tile, substantially as described.

In testimony whereof, we have hereunto set our hands.

SOLOMON B. MYERS.
JOSEPH FREUND.

Witnesses as to Solomon B. Myers:
H. R. LINBARGER,
H. P. GRANT.

Witnesses as to Jos. Freund:
H. M. CORWIN,
JESSE B. HELLER.